United States Patent
Horisberger

(10) Patent No.: US 7,040,629 B2
(45) Date of Patent: May 9, 2006

(54) CLAMPING DEVICE FOR ELONGATED WORKPIECES

(75) Inventor: Alfred Horisberger, Bützberg (CH)

(73) Assignee: Bystronic Laser AG, Niederonz (CH)

( * ) Notice: Subject to any disclaimer, the term of this patent is extended or adjusted under 35 U.S.C. 154(b) by 0 days.

(21) Appl. No.: 10/685,271

(22) Filed: Oct. 14, 2003

(65) Prior Publication Data

US 2004/0076486 A1 Apr. 22, 2004

Related U.S. Application Data

(60) Provisional application No. 60/419,276, filed on Oct. 17, 2002.

(51) Int. Cl.
*B23B 31/171* (2006.01)

(52) U.S. Cl. ............... 279/4.12; 279/121; 279/137; 409/197; 29/33 T; 29/33 D

(58) Field of Classification Search ............. 279/4.1, 279/4.12, 121, 122, 124, 137, 114, 123; 269/152, 269/268, 55–85; 409/189, 197, 198; 29/33 T, 29/33 D See application file for complete search history.

(56) References Cited

U.S. PATENT DOCUMENTS

| | | | | |
|---|---|---|---|---|
| 1,469,360 A | * | 10/1923 | Cullen | 82/122 |
| 2,147,800 A | * | 2/1939 | Sadowski | 269/151 |
| 2,431,101 A | * | 11/1947 | Woods | 269/69 |
| 2,451,705 A | * | 10/1948 | Sandford | 279/4.12 |
| 3,083,024 A | * | 3/1963 | Herbkersman | 279/5 |
| 3,318,594 A | * | 5/1967 | Weiser | 269/265 |
| 3,771,393 A | * | 11/1973 | Gatto et al. | 82/53.1 |
| 4,277,231 A | * | 7/1981 | Gordon | 425/387.1 |
| 4,593,451 A | * | 6/1986 | Roberts | 29/560 |
| 4,684,310 A | * | 8/1987 | Stange | 414/427 |
| 5,097,576 A | * | 3/1992 | Kadono et al. | 29/33 T |
| 5,180,274 A | * | 1/1993 | Haugen et al. | 414/427 |
| 5,540,526 A | * | 7/1996 | Hyatt et al. | 408/1 R |
| 5,829,932 A | * | 11/1998 | Kis et al. | 409/186 |
| 5,842,703 A | * | 12/1998 | Antoni | 279/123 |
| 6,012,884 A | * | 1/2000 | Azema | 409/191 |
| 6,439,813 B1 | * | 8/2002 | Repossini | 409/235 |
| 6,478,136 B1 | * | 11/2002 | Novak | 198/346.1 |
| 6,551,038 B1 | * | 4/2003 | Sugata et al. | 409/134 |
| 6,623,222 B1 | * | 9/2003 | Kroll et al. | 409/235 |
| 6,652,204 B1 | * | 11/2003 | Stengele et al. | 409/235 |
| 2004/0102297 A1 | * | 5/2004 | Quak et al. | 483/56 |

FOREIGN PATENT DOCUMENTS

| | | |
|---|---|---|
| CH | 677332 | 5/1991 |
| DE | 3504713 | 8/1986 |
| FR | 2587926 | 4/1987 |
| JP | 56146603 A * | 11/1981 |

* cited by examiner

*Primary Examiner*—Boyer D. Ashley
*Assistant Examiner*—Michael W. Talbot
(74) *Attorney, Agent, or Firm*—Schweitzer Cornman Gross & Bondell LLP

(57) ABSTRACT

An arrangement for clamping raw materials in a machine tool for machining elongated workpieces is provided. The arrangement comprises a supporting plate with at least one thoroughgoing opening and at least one clamping device arranged in front of one of the openings. The clamping device has a pair of clamping rings that drive pairs of jaws. When a pair of clamping devices are utilized, the first clamping device may be used primarily for the clamping of profiles, while the second clamping device is designated for round bodies.

18 Claims, 4 Drawing Sheets

CLAMPING DEVICE FOR ELONGATED WORKPIECES

The present invention relates to a clamping device and, in particular, to a clamping device well adapted for use in connection with machine tools, including laser machine tools, for machining elongated workpieces. The present application claims the benefit of provisional application No. 60/419,276 filed 17 Oct. 2002.

BACKGROUND OF THE INVENTION

Elongated work pieces, such as pipes, bars, and flat and hollow profiles, are slid through a chuck of a suitable laser machine and cut and/or welded at their free end by a laser beam. Frequently the workpieces are supported at their free end in order that they do not sag or bend during machining. These known chucks have the disadvantages that they are only suitable for circular cylindrical workpieces. Profile elements and non-symmetrical workpieces cannot be clamped precisely therewith.

The problem to be solved with the present invention is to create a universally useable clamping device which can securely clamp elongated full or hollow profile elements of any cross-section during laser machining and the like. The device should be suitable for automated working processes and should permit short spanning and changeover times.

BRIEF DESCRIPTIONS OF THE INVENTION

The problem is solved by the present invention, which is a clamping device having a supporting plate, preferably vertically oriented, having at least one adjustable workpiece clamping unit and at least one through-going bore for a workpiece. The clamping unit may have clamping rings that support opposed pairs of jaws. The jaw pairs may be advantageously oriented orthogonally to each other. Rotation of a clamping ring causes the respective jaws of a pair to open or close; rotation of both clamping rings allowing the jaw pairs to grip or release a workpiece, accommodating both profile and non-symmetrical workpieces.

A second through-going opening in the supporting plate may be provided to allow a workpiece to extend therethrough for engagement with a second clamping unit, which may be of conventional construction, located at a fixed vertical orientation. With provided means to orient the supporting plate vertically, such as a linear drive, the first clamping unit can be positioned as required.

The clamping rings may be operated pneumatically, with cylinders having double pistons to control the rotation direction. The rings may be provided with cam or wedge surfaces engaging the jaws to move the jaws radially in response to ring rotation. A two-part jaw construction, in which clamping jaws are positionable upon base jaws, further allow the clamping unit to accommodate a range of workpiece cross-sections and profiles. The use of mating teeth on the base and clamping jaws may provide for quick and secure adjustment.

BRIEF DESCRIPTION OF THE DRAWINGS

Illustrative embodiments of the invention are hereinafter described with reference to the annexed drawings, in which.

DETAILED DESCRIPTION OF THE INVENTION

Figure 1:
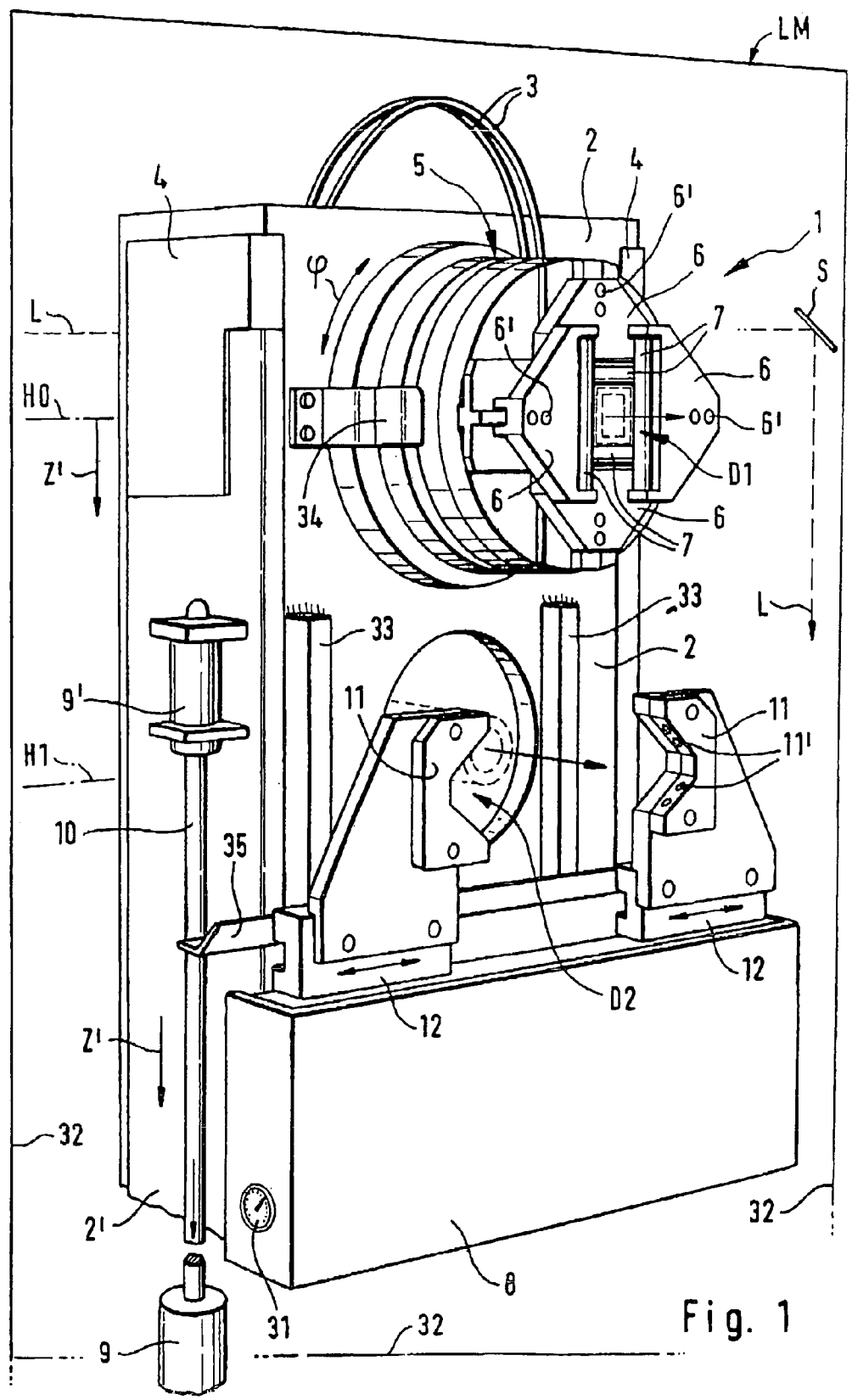
FIG. 1 is a perspective view of a portion of a laser machine with a clamping device according to the invention.

FIG. 1 is a simplified representation of a laser machine LM. The laser beam L is guided in known manner by a beam guide and deflecting mirrors S to the working space of the machine. An upper clamping unit 1 for profile elements is arranged on a supporting plate 2. The power for the clamping unit 1 is supplied by compressed air hoses 3.

The supporting plate 2 is slideably guided laterally by guiding flanges 4 and frontally by guide rails 33 welded to the plate 2 for vertical displacement in the direction Z'. The clamping unit 1 includes clamping jaws 6 with rollers 7, which clamping jaws are rotatably supported on the supporting plate 2 via respective rings 5. The clamping jaws 6 are easily exchangeable and are fixed in position on the clamping device 1 by fastening screws 6' on their base bodies. The thoroughgoing openings for the workpieces between the jaw of the upper clamping unit 7 and a second, lower clamping unit are designated D1 and D2, respectively. In the opening D1 a rectangular hollow profile is shown in phantom, and in the opening D2 a pipe. The displacement movement of these raw materials is effected in the direction of the respective arrows by a handling system arranged behind the clamping device. The guide rails 33 are protected by a protecting profile 35 against dirt and damage by rebounding workpieces or cut-off parts.

The entire clamping device 1 is rotatable in directions which are represented by the arc φ. The position of the clamping device 1 with respect to the machine is continuously monitored by a position sensor 34 and signaled to an NC control unit as known in the art.

At the lower part of the supporting plate 2 a horizontal support 8 is arranged on the lower portion of the machine base 32. A pair of steady supports 12 with steadies 11 and embedded spheres 11' are horizontally displaceably mounted on the support 8. The displacement motion of the steady supports 12 is shown by the double-headed arrows. A manometer 31 for monitoring of optimal air supply pressure is mounted on a face of the support 8.

Angle profile members 2' on opposite sides of the supporting plate 2 are arranged on the plate 2 and provide vertical adjustment. As can be seen, a counterbearing 9' of pushing bar 10 of electromagnetic linear drive 9 is mounted on the middle part of the front of angle profile 2'. The drive 9 can move the upper, first clamping unit from an initial position H0 into a lowered working position H1. The movement is marked by the arrow Z'.

Figure 2:
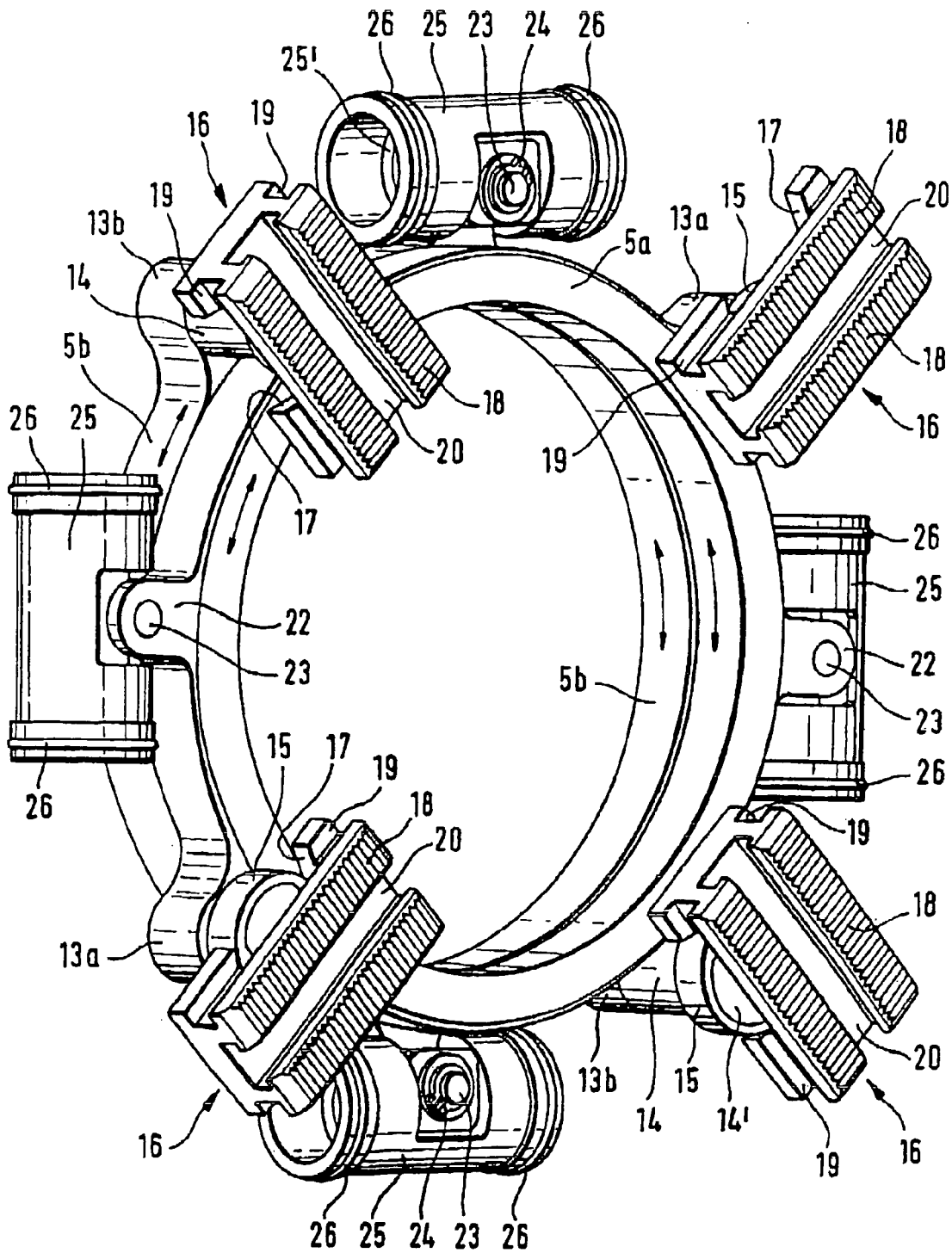
FIG. 2 is a perspective view of the clamping jaws of an upper clamping unit shown in FIG. 1 with their actuating cylinders and the associated power transmission, a cover ring or flange for the clamping device having been removed.

The clamping rings 5 visible in FIG. 1 comprise, according to FIG. 2, a first ring 5a and a second ring 5b. The ring 5a effects an adjustment of a first pair of opposed base jaws 16 associated with, for example, the vertical jaws in FIG. 1. The ring 5b effects the adjustment of a second pair of opposed jaws 16 associated with the horizontal jaws in FIG. 1. Both rings 5a and 5b are rotatable independently of each other and each have roller supports 13a, 13b, respectively, shifted against each other by an angle of 90°. Roller shaft bearers 14 with rollers 15 at one end are inserted in the roller supports 13a, b.

The outer rings of rollers 15 each bear against a pair of opposed cam or wedge surfaces 17 formed in each of the base jaws 16, and drive the base jaws radially inward or outward depending on the direction of rotation of the corresponding clamping ring. Each clamping ring has a pair of piston supports 22, located between the respective roller shaft bearers, which connect to an axially displaceable piston 25' in a piston cylinder 25. Preferably, as shown, the piston is a double piston. The pistons are secured to the piston supports by piston bolts 23 and standard securing rings 24 called "Seegerrings".

The base jaws 16 have on their face side a central fastening groove 20 and lateral toothings 18. The grooves 20 facilitate the positioning and mounting of the clamping jaws 6 on the base jaws, such as by retaining screws 6'. The lateral grooves 19 mate with corresponding grooves in chuck body 29 and maintain the base jaws in register when the clamping rings rotate.

Figure 3:
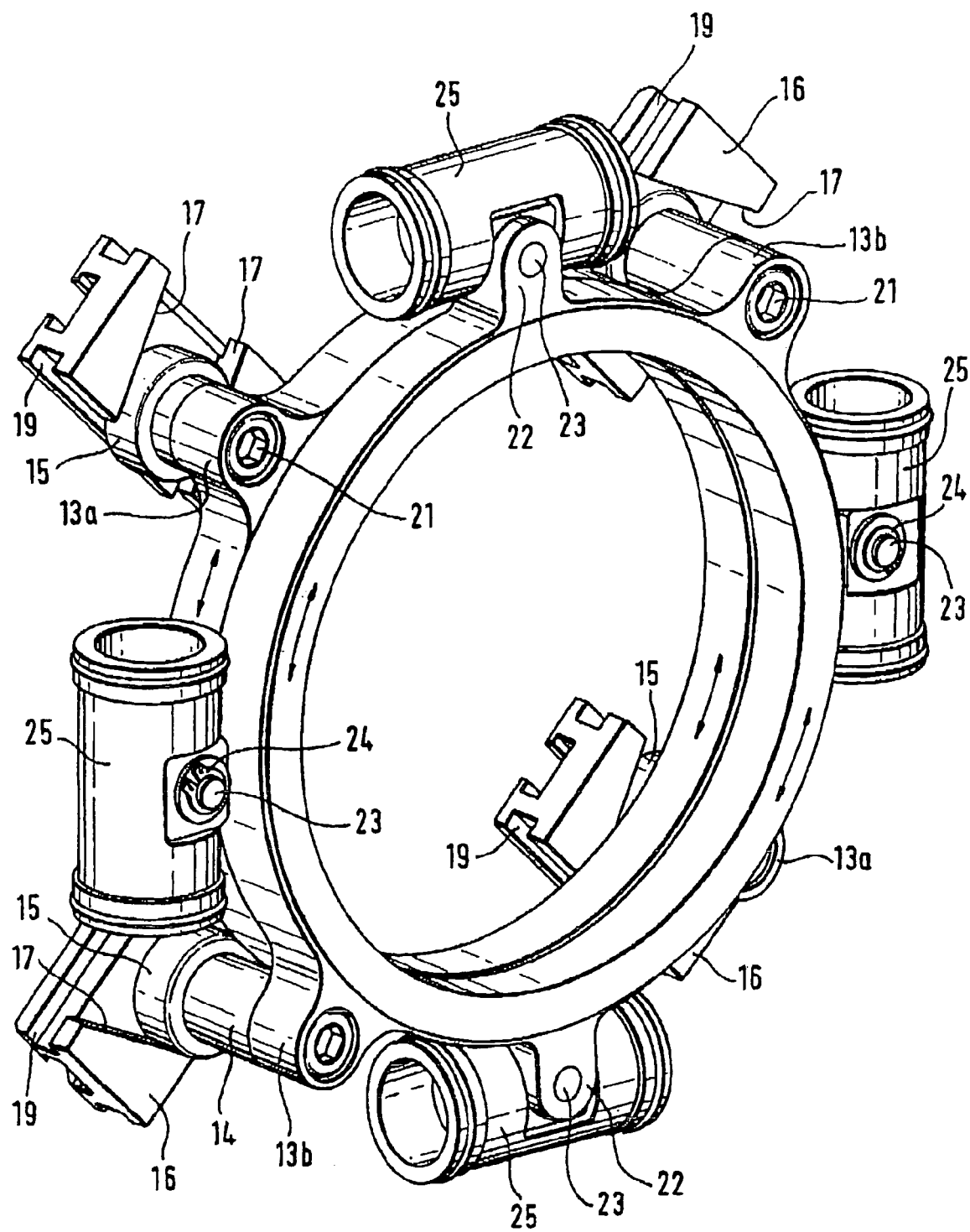
FIG. 3 is a view of the clamping jaws from the opposite side than in FIG. 2.

FIG. 3 shows the arrangement described above from the opposite side. Visible are the wedge surfaces 17 and the lateral grooves 19 in the base jaws 16. The rollers 15 can be seen as well between the embedded wedge surfaces 17, as well as the screw connection 21 for the roller shaft bearers 14.

Figure 4:
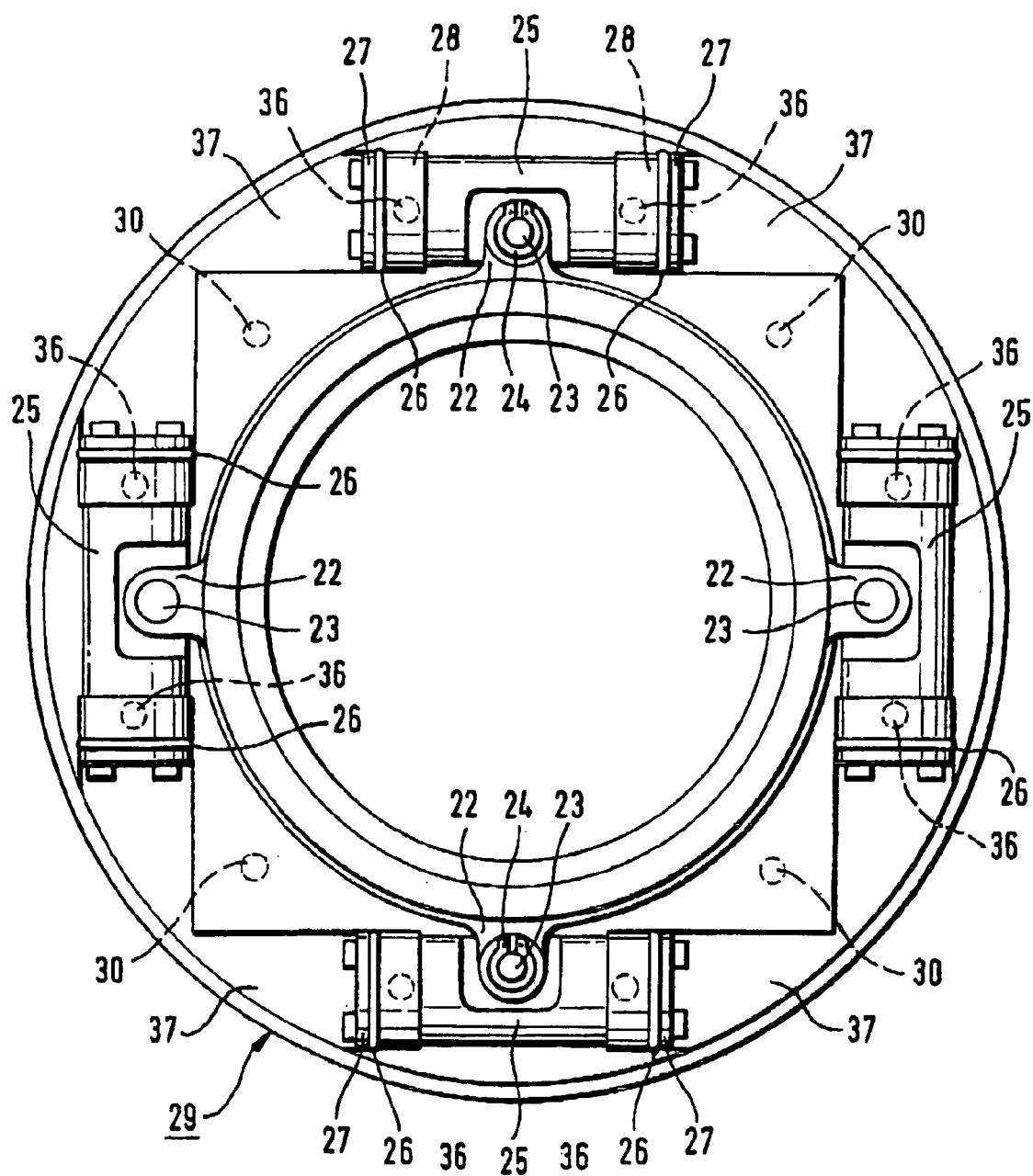
FIG. 4 is a plan view of the clamping unit of FIGS. 2 and 3 with a pressurized air supply, also with an outer covering flange being removed.

The plan view of FIG. 4 shows the same arrangement, equally with the outer covering ring removed, mounted on the chuck body 29. Cylinder covers 27 are screwed onto the ends of cylinders 25. The cylinders 25 are maintained in defined positions on the chuck body by positioning rings 26 fitting into accommodating recesses 37 in the chuck body 29. On their back side (as seen in FIG. 4) the cylinders 25 each have two connections for compressed air, these connections ending in thoroughgoing openings 36 in the chuck body 29, and are supplied with energy via the compressed air hoses 3 through air tight flanges with cavities as known in the art. The chuck body 29 is screwed onto a driven hollow spindle (not shown) by bolts through centering borings 30.

The function of the clamping unit according to FIGS. 2–4 is as follows:

Depending on the profile to be clamped (workpiece/blank) the clamping jaws 6 are screwed onto the base jaws 16 with clearance against the profile. The positioning and maintenance of the clamping jaws 6 upon the corresponding base jaws 16 is facilitated by the base jaw toothing 18, the clamping jaws 6 having corresponding teeth. The hoses 3 are supplied with compressed air (controlled by the NC program) and the compressed air act on the pistons 25' (FIG. 2), closing the clamping unit, i.e. the clamping jaws 6 clamp the profile with a force of about 60 kg per jaw. The force transmission is easily seen; two opposing double pistons each move the ring 5a and/or 5b such that the rollers 15 roll on the wedge surfaces 17 thereby moving the base jaws 16 radially in their lateral grooves 19 in respective grooves of the outer chuck body 29.

The embodiment shown allows very short clamping and opening times which enables shorter working cycles.

The second clamping unit 11, 11', 12 (see FIG. 1) works similar to a known steady rest and is designed for rotationally symmetric workpieces. It is operated pneumatically as well and can easily be moved away from the vertical support when the first clamping unit is in operation. A conventional drive is associated with the first clamping unit 1 such that workpieces can be cut by the laser beam L around the entire circumference of the profile supplied and clamped. The rotational speed of the clamping unit 1 can be increased in a short time to several hundred rpm. Thereby cut-out parts of the workpiece can be ejected by centrifugal action.

I claim:

1. A clamping device for elongated workpieces to be acted upon by a machine tool, comprising a vertically movable, vertically arranged supporting plate having at least one horizontal throughgoing opening, an adjustable first workpiece clamping unit located in front of one of the at least one opening, means for slideably guiding the supporting plate, and a drive for adjusting a height of the at least one throughgoing openings to a working level of a workpiece, the drive comprising a pushing bar connected to the supporting plate, the first clamping unit having self-centering jaws, a first clamping ring coupled to a first opposed pair of the jaws and a second clamping ring coupled to a second opposed pair of the jaws.

2. The clamping device according to claim 1, wherein the first and second opposed pairs of clamping jaws are orthogonal to each other.

3. The clamping device according to claim 1, further comprising at least one cylinder having a piston coupled to one of the first and second clamping rings.

4. The clamping device according to claim 3 wherein the piston is a double piston.

5. The clamping device according to claim 3 wherein at least one cylinder is mounted to a chuck body.

6. The clamping device according to claim 1, further comprising a base jaw associated with each clamping jaw, each base jaw having wedge surfaces, and a roller bearing against the wedge surfaces to transform rotational motion of a clamping ring into orthogonal clamping motion for the associated clamping jaw.

7. The clamping device according to claim 6 wherein a base jaw is provided on a front side with a fastening groove and two rows of toothing.

8. The clamping device according to claim 1 further comprising compressed air channels which open into flanges coupled to cylinders of the first clamping unit, the first clamping unit being provided with a drive for rotation through an angle of at least 360°.

9. The clamping device according to claim 1, further comprising a second clamping unit arranged on a base of the machine tool, and means associated with the second clamping device to position the second clamping device in a non-conflicting position when the first clamping device is in operation.

10. The clamping device according to claim 9 wherein the second clamping unit has jaws with spherical segments on clamping faces.

11. A damping device for elongated workpieces to be acted upon by a machine tool, comprising a vertically movable, vertically arranged supporting plate having at least one horizontal throughgoing opening, an adjustable first workpiece clamping unit located in front of one of the at least one opening, a second clamping unit having jaws with spherical segments on clamping faces arranged on a base of the machine tool, and means associated with the second clamping device to position the second clamping device in a non-conflicting position when the first clamping device is in operation.

12. A clamping device for elongated workpieces to be acted upon by a machine tool, comprising a vertically movable, vertically arranged supporting plate having at least one horizontal throughgoing opening and an adjustable first workpiece clamping unit located in front of one of the at least one opening, the first clamping unit having pneumatically operated and self-centering jaws, a first clamping ring coupled to a first opposed pair of the jaws and a second clamping ring coupled a second opposed pair of the jaws.

13. The clamping device according to claim 12, further comprising a base jaw associated with each clamping jaw, each base jaw having wedge surfaces, and a roller bearing against the wedge surfaces to transform rotational motion of a clamping ring into orthogonal clamping motion for the associated clamping jaw.

14. The clamping device according to claim 12, further comprising at least one cylinder having a piston coupled to one of the first and second clamping rings.

15. The clamping device according to claim 14 wherein at least one cylinder is mounted to a chuck body.

16. The clamping device of claim 14 wherein the piston is a double piston.

17. The clamping device of claim 12 wherein the first and second opposed pairs of clamping jaws are orthogonal to each other.

18. A clamping device for elongated workpieces to be acted upon by a machine tool, comprising a vertically movable, vertically arranged supporting plate having at least one horizontal throughgoing opening; an adjustable first workpiece clamping unit located in front of one of the at least one opening; means for slideably guiding the supporting plate, a drive for adjusting a height of the at least one throughgoing opening to a working level of a workpiece, the drive comprising a pushing bar connected to the supporting plate; a second clamping unit arranged on a base of the machine tool, the second clamping unit having jaws with spherical segments on clamping faces; and means associated with the second clamping unit to position the second clamping device in a non-conflicting position when the first clamping unit is in operation.

* * * * *